(12) United States Patent
Zitlaw et al.

(10) Patent No.: US 11,971,832 B2
(45) Date of Patent: Apr. 30, 2024

(54) METHODS, DEVICES AND SYSTEMS FOR HIGH SPEED TRANSACTIONS WITH NONVOLATILE MEMORY ON A DOUBLE DATA RATE MEMORY BUS

(71) Applicant: Infineon Technologies LLC, San Jose, CA (US)

(72) Inventors: Clifford Zitlaw, San Jose, CA (US); Stephan Rosner, Campbell, CA (US); Hans Van Antwerpen, Mountain View, CA (US); Morgan Andrew Whately, San Franscisco, CA (US)

(73) Assignee: INFINEON TECHNOLOGIES LLC, San Jose, CA (US)

( * ) Notice: Subject to any disclaimer, the term of this patent is extended or adjusted under 35 U.S.C. 154(b) by 0 days.

(21) Appl. No.: 17/125,927

(22) Filed: Dec. 17, 2020

(65) Prior Publication Data
US 2022/0107908 A1    Apr. 7, 2022

Related U.S. Application Data

(60) Provisional application No. 63/088,572, filed on Oct. 7, 2020.

(51) Int. Cl.
*G06F 13/16*    (2006.01)
*G06F 13/28*    (2006.01)
(Continued)

(52) U.S. Cl.
CPC .......... *G06F 13/1689* (2013.01); *G06F 13/28* (2013.01); *G06F 13/409* (2013.01); *G06F 13/4291* (2013.01)

(58) Field of Classification Search
CPC .................. G06F 13/4291; G06F 13/1689
See application file for complete search history.

(56) References Cited

U.S. PATENT DOCUMENTS

2013/0013878 A1 * 1/2013 Frans .................. G06F 13/1689
                                                          711/E12.001
2019/0325980 A1   10/2019 Nelson et al.
(Continued)

OTHER PUBLICATIONS

International Search Report and Written Opinion for International Application No. PCT/US21/53916 11 Pages dated Jan. 12, 2022.

*Primary Examiner* — David E Martinez

(57) ABSTRACT

A method can include: receiving a plurality of consecutive commands on a unidirectional command-address (CA) bus input of a discrete nonvolatile memory (NVM) device, the commands being synchronous with a timing clock; for each received command, determining if the command is an express read (NVR) command, if a command is determined to be an NVR command, determining if a next consecutive command is an NVR command, wherein consecutive NVR commands form an NVR command sequence; in response to the no more than the NVR command sequence, accessing read data stored in NVM cells of the NVM device; and driving the read data on parallel data input/outputs (I/Os) of the NVM device in a burst of data values, the data values of the burst being output in synchronism with rising and falling edges of the timing clock; wherein the CA bus input includes a plurality of parallel CA signal inputs. Related memory devices and systems are also disclosed.

13 Claims, 15 Drawing Sheets

(51) Int. Cl.
*G06F 13/40* (2006.01)
*G06F 13/42* (2006.01)

(56) References Cited

U.S. PATENT DOCUMENTS

2021/0042054 A1* 2/2021 Van Antwerpen ..... G11C 16/26
2021/0042245 A1* 2/2021 Betser ................. G06F 13/4234

* cited by examiner

DDR4 CONFIG 1021-1

| Reg. | Function | Variables |
|---|---|---|
| 00h | DEVICE INFO | |
| 01h | BUS CFG1 | |
| ⋮ | | |
| XXh | EXPRESS ACCESS | (e.g., Inter-Instruction Delay, BL) } 1024 |

FIG. 10A

SFDP 1021-2

| Byte Address | Description |
|---|---|
| 0000h | |
| ⋮ | |
| XXXXh | STANDARD ACCESS CAPABLE } 1025 |

| | | CA PINS | | | | | | |
|---|---|---|---|---|---|---|---|---|
| | CS | CA0 | CA1 | CA2 | CA3 | CA4 | CA5 | CA6 |
| LPDDR4 (ACT1/ACT2/ READ/CAS) | H | CMD | CMD | | | | | | } 1035H
| | L | | | | | | | | } 1035L

| | | CA PINS | | | | | | |
|---|---|---|---|---|---|---|---|---|
| | CS | CA0 | CA1 | CA2 | CA3 | CA4 | CA5 | CA6 |
| NVR1/ NVR2 | H | CMD | ADD | | | | | |
| | L | | | | | | | |

1041

FIG. 10D (BACKGROUND)

METHODS, DEVICES AND SYSTEMS FOR HIGH SPEED TRANSACTIONS WITH NONVOLATILE MEMORY ON A DOUBLE DATA RATE MEMORY BUS

RELATED APPLICATIONS

This application claims the benefit of U.S. provisional patent application having Ser. No. 63/088,572, filed on Oct. 7, 2020, the contents of which are incorporated by reference herein.

TECHNICAL FIELD

The present disclosure relates generally to systems requiring high speed accesses to memory devices, and more particularly to systems accessing nonvolatile memory devices over double-data-rate interfaces.

BACKGROUND

Systems-on-chip (SoCs) can enable high performance control of devices in a very compact package. SoCs enjoy wide use from very compact devices (e.g., cell phones) to very large devices (e.g., automobiles). SoCs typically include processor circuits and on-board memory for storing data, including instructions executable by a processor. SoC performance is often very dependent upon memory access speeds. For ambient and lower temperature applications, SoCs can include a combination of a nonvolatile memory (NVM) and a volatile memory, such as dynamic random access memory (DRAM). NVM can store data in the absence of power. DRAM can provide acceptable access speeds and consume relatively little power. In such systems, it is common to load data from the NVM into DRAM for access by processors and/or to back up DRAM data with the NVM.

For higher temperature applications, such as automobiles, DRAM performance can drop as temperature rises making DRAM [is] an undesirable memory choice. As a result, higher temperature applications can employ static RAM (SRAM) as a volatile memory. While SRAM can provide even faster speeds than DRAM, SRAM can have a high component price and can draw more power than DRAM.

FIG. 19 is a block diagram of a conventional DRAM read operation that is compatible with the LPDDR4 standard promulgated by JEDEC. At time t0, a first read command sequence can be received. A read command sequence can include two activate instructions (Activate1, Activate2), a read instruction and a CAS instruction. The read command sequence can be received over eight clock cycles (of CK_t) (i.e., from time t0 to t2).

At time t2, a second read sequence can begin having the same types of instructions as the first read sequence.

A DRAM can have a read latency (RL) of 14 clocks and a skew delay (tDQSCK) of about two clocks (at an 800 MHz clock speed). Following such a delay, read data can be output at time t4. Read data can be output with a minimum burst of sixteen (or 32 depending upon a burst length setting). For the burst of 16 shown, a total time to receive the burst of 16 can be 31 clocks, or 38.75 ns at 800 MHz.

In a x32 configuration, 64 bytes can be transferred over the eight clock cycles (between times t4 and t5). For systems having a cache memory of 32 bytes, such a read transfer can result in 32 bytes being discarded.

While DRAMs (including LPPDR4 compatible DRAMs as shown in FIG. 19) can provide rapid access speeds for systems like SoCs, as noted above DRAMs are not suitable for some environments, such as higher temperature environments.

It would be desirable to arrive at some way of providing high speed access to memories for higher temperature applications that does not suffer from the drawbacks of conventional approaches.

BRIEF DESCRIPTION OF THE DRAWINGS

FIGS. 10A and 10B show registers of a NVM device that can be included in embodiments.

FIG. 10C is a diagram showing a conventional LPDDR4 command format.

FIG. 10D is a diagram showing an express access command format according to an embodiment.

DETAILED DESCRIPTION

Figure 1A:
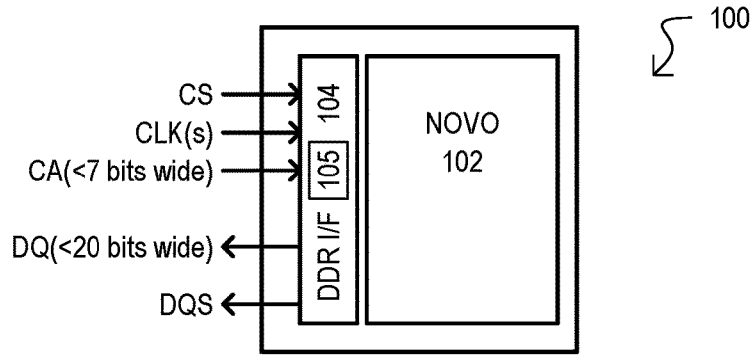
FIGS. 1A to 1C are diagrams showing a nonvolatile memory (NVM) device and express access operations according to embodiments.

According to embodiments, a nonvolatile memory (NVM) device can process a reduced sequence of read commands (NVR commands) to read data from NVM cells of one or more arrays. In some embodiments, NVR command pairs can have all command and address data required for a read operation. Read data corresponding to NVR commands can be output from the NVM device at a double data rate (DDR). In some embodiments, read data can be output in bursts of eight data.

In some embodiments, an NVM device can have an interface compatible with a physical interface according to the LPDDR4 standard.

In some embodiments, NVR command pairs can have command values distributed across both NVR commands of the pair. In some embodiments, NVR command pairs can have address values distributed across both NVR commands of the pair.

In some embodiments, NVR commands can have a format that follows commands according to the LPDDR4 standard. However, one or more bit locations that provide command data in LPDDR4 commands can provide address data in a NVR command.

In some embodiments, a NVM device can include a serial interface in addition to the DDR interface.

In some embodiments, a NVM device can be part of a system that executes cache line reads to a cache memory. Express access operations (read accesses executed with NVR commands) to one or more NVM devices can fill a cache line without having to discard any read data.

In some embodiments, a NVM device can be part of a system having a memory controller. The memory controller can issue read command sequences with NVR commands to an NVM device as well as read command sequences according to an existing standard (e.g., LPDDR4) to another device (e.g., a dynamic random access memory (DRAM)). Read sequences according to the existing standard can have more commands (e.g., four commands) as compared to sequences of NVR commands (e.g., two commands).

In the various embodiments below, like items are referred to by the same reference characters, but with the leading digit(s) corresponding to the figure number.

FIG. 1A is a block diagram of a NVM device 100 according to an embodiment. NVM device 100 can include one or more memory cell arrays 102 and a DDR interface 104. In the embodiment shown, memory cell arrays 102 can be NVM cell arrays 102 which can include NVM cells of any suitable type that can retain data in the absence of power. In some embodiments, NVM cell arrays 102 can include decoder circuits to access NVM cells in response to address values, as well as writing circuits (e.g., program and erase circuits) for storing data values in the NVM cells. In some embodiments memory cell arrays 102 can include volatile memory cells, including but not limited to dynamic random access memory (DRAM) cells and/or static RAM (SRAM) cells, with suitable access circuits and auxiliary circuits (e.g., decoder circuits, refresh circuits for DRAMs, etc.).

A DDR interface 104 can include a command and address (CA) input, a parallel data connection (DQ), and one or more clock inputs (CLKs). CA input can receive command and address data for accessing storage locations of NVM cell array 102. A CLK input can receive one or more clock inputs for timing input and output signals for the NVM device 102. DQ connection can output parallel data values in response to requests received on CA input. Output data values can be provided in synchronism with both rising and falling edges of an input clock (i.e., at a double data rate). In some embodiments, DQ can be unidirectional, and only provide output data from the NVM device. However, in other embodiments DQ can be bidirectional, and so can both receive and output data.

In some embodiments, a DDR interface 104 can have signaling compatible with an existing memory standard. In an embodiment, a DDR interface 104 can have signaling compatible with the LPDDR4 standard promulgated by JEDEC. That is, DDR interface 104 can have a physical interface compatible with the LPDDR4 physical interface standard (i.e., LPDDR4 PHY).

While DDR interface 104 can have signaling compatible with an existing standard, DDR interface 104 can process shorter read command sequences than such an existing standard. In some embodiments, DDR interface 104 can be compatible with the LPDDR4 PHY, but can process express read sequences of two commands, as opposed to read sequences of four commands dictated by the LPDDR4 standard.

A DDR interface 104 can include a command decoder 105 for executing express accesses as described herein. In some embodiments, a command decoder 105 can recognize express access commands to enable accesses to NVM cell arrays 102. In some embodiments, a command decoder 105 can distinguish express access commands from other commands. Consecutive sequences of express access commands can be considered an express command sequence. An express command sequence can include all instruction and address data for executing an access to the NVM device 102. In some embodiments, a DDR interface can be compatible with an existing standard (e.g., LPDDR4) and an express command sequence can include fewer commands than accesses according to the existing standard.

In some embodiments, a CA input can be less than seven bits wide and a DQ connection can be less twenty bits wide.

In some embodiments, a NVM device 102 can be an integrated circuit device that includes one or more integrated circuit (IC) substrates formed in a single IC package.

Figure 1B:
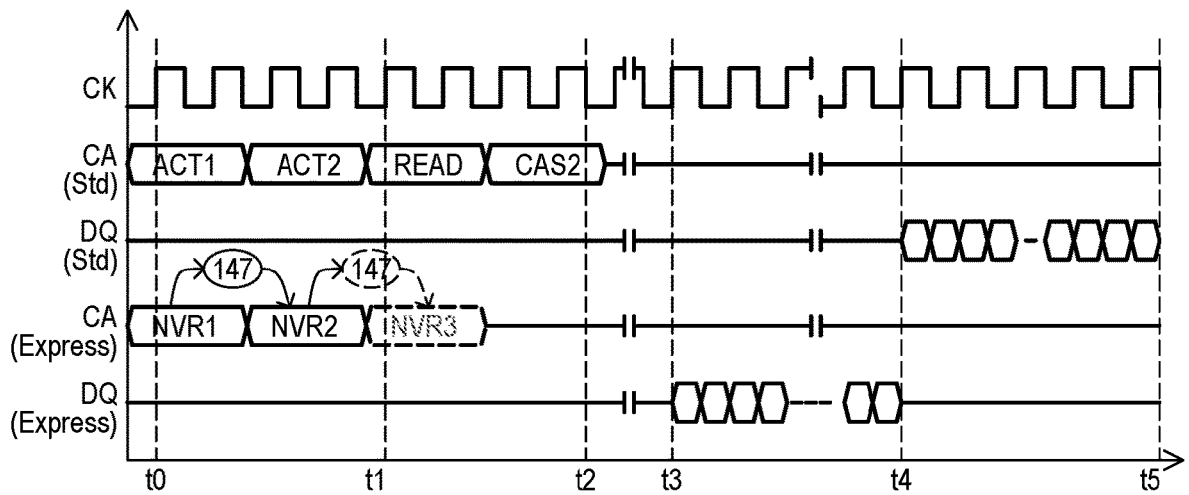

FIG. 1B is a timing diagram showing access operation for a NVM device like that of FIG. 1A. FIG. 1B shows a read access that is compatible with a predetermined standard (Std), as well as an express read access (Express) to an NVM device according to an embodiment, that can occur in a smaller number of clock cycles than the standard read access.

FIG. 1B includes waveforms for a timing clock (CK); a CA input for a standard access (CA(Std)); a CA input in an express access (CA(Express)); output data in a standard access (DQ(Std)); and output data for an express access (DQ(Express)).

At time t0, a read command sequence can be received at a memory device. The read command sequence can include the command and address values for one read operation. FIG. 1B shows command-address values for the standard case as well as the express case. As shown, the standard read command sequence requires "n" commands (Std0-Stdn), where n is greater than two. In contrast, the express access is composed of fewer NVR commands (NVR1, NVR2 and possible NVR3).

In response to receiving a first NVR command (NVR1), the command can be evaluated (shown as 147) to determine if it is an express access command. If a received command is an express access command, a next command of the sequence can be examined to determine if it is an express access command. Sets of consecutive express access commands can form an express access command sequence. Thus, FIG. 1B shows an express access command sequence of NVR1/NVR2 (sequence of two) and optionally NVR1/NVR2/NVR3 (sequence of three).

At time t1, reception of the express read command sequence (NVR1/NVR2) can be completed. After time t1 and before time t2, express read command sequence (NVR1/NVR2/NVR3) can be completed.

At time t2, reception of the standard read command sequence (shown as ACT1, ACT2, READ, CAS2 but not being limited to any particular protocol/standard) can be completed, requiring more clock cycles than the express cases.

At time t3, data corresponding to the express read command sequences can be output.

At time t4, a data output for the express access from the NVM device can be complete. In the example shown, also at this time, data corresponding to the standard read command sequence can be output.

At time t5, a data output for the standard access can be complete.

In the embodiment shown, an express read operation can include fewer commands (and hence fewer clock cycles) and, optionally, retrieve data in a smaller burst sequence than the standard read access. As a result, express read operations can occupy less time on the CA bus and retrieve data in a shorter amount of time than a standard read operation. In some embodiments, a smaller burst sequence can be a selectable feature of the memory device, with larger burst sequences (including those of conventional size) being supported.

While FIG. 1B shows NVR commands being received over two clock cycles of CK, alternate embodiments can receive NVR commands over a longer number of clock cycles. As but one example, the command and address data included in NVR1/NVR2 of FIG. 1B could be included in one NVR command occupying four clock cycles.

In some embodiments, NVR commands can be received over j×2 clock cycles, where j is an integer of at least one.

Figure 1C:
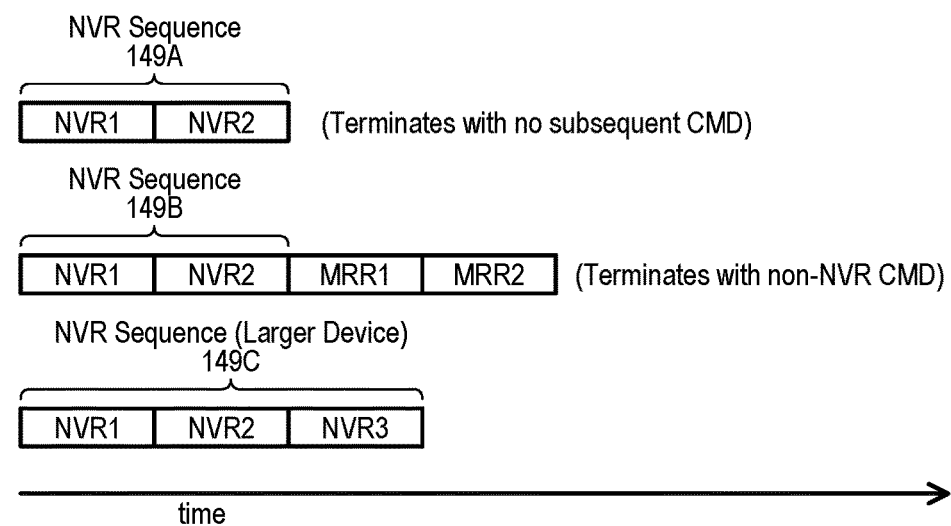

FIG. 1C is a diagram showing various examples of express read (NVR) command sequences according to embodiments. It is understood that such sequences occur over time as consecutive commands issued from a controller device and/or received at an NVM device. Consecutive commands can be commands that are received one after the other with no intervening delay, or no intervening delay of a sufficiently long duration.

NVR command sequence 149A shows a two command sequence (NVR1/NVR2) that is terminated by no further command being received. From bit values in NVR1, a command decoder can determine that the command is an NVR command. As a result, a command decoder can treat the next consecutive command as a possible NVR command. Thus, NVR2 can be detected at a next NVR command of the sequence. In the embodiment shown, the NVR command sequence 149A terminates when as there is no consecutive command following NVR2. In some embodiments, a command is received over a predetermined number of timing clock cycles. If a command is not received in such an amount of clock cycles, any NVR command sequence can be considered terminated.

When the command sequence is terminated, the resulting NVR commands (NVR1/NVR2) of the sequence are used to access NVM cells. That is, commands NVR1/NVR2 are understood to contain all command and address data needed for the read access.

NVR command sequence 149B shows an NVR command sequence like 149A, but the NVR command sequence is terminated by receipt of a non-NVR command. A command decoder can detect NVR1, then examine the next command (NVR2) and determine that it is also an NVR command, and thus part of the same NVR command sequence. Because NVR2 is an NVR command, a command decoder can look to the next consecutive command (MRR1) to determine if it is an NVR command. However, in this case MRR1 is not an NVR command. As a result, the NVR command sequence can end, and the NVM cells accessed with address values in NVR1/NVR2.

NVR command sequence 149C shows an NVR command sequence like 149A, but with more NVR commands. In some embodiments, an address space of a targeted memory device may require more address bits than can be provided in two NVR commands. Accordingly, one or more NVR commands (in this case one command NVR3) can be added to the NVR command sequence. A longer express read command sequence can be terminated in the same manner as shown above. Further, NVR command sequences can have any number of NVR commands, including more than three NVR commands.

It is understood that an NVR command sequence can include one NVR command.

Figure 2:
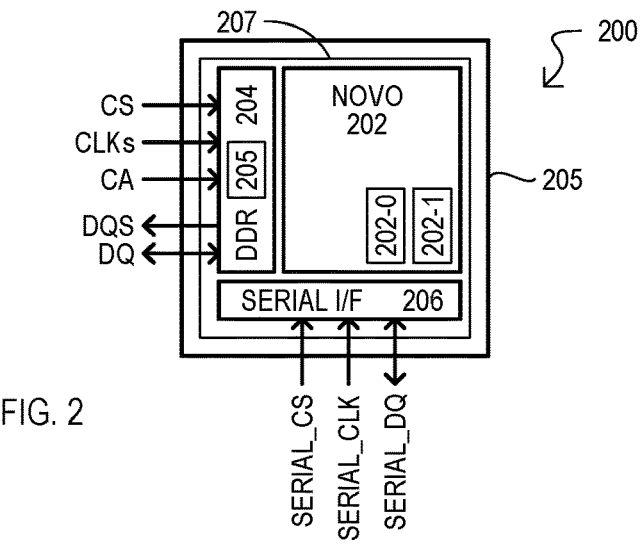
FIG. 2 is a block diagram of a NVM device according to an embodiment.
Figure 3:
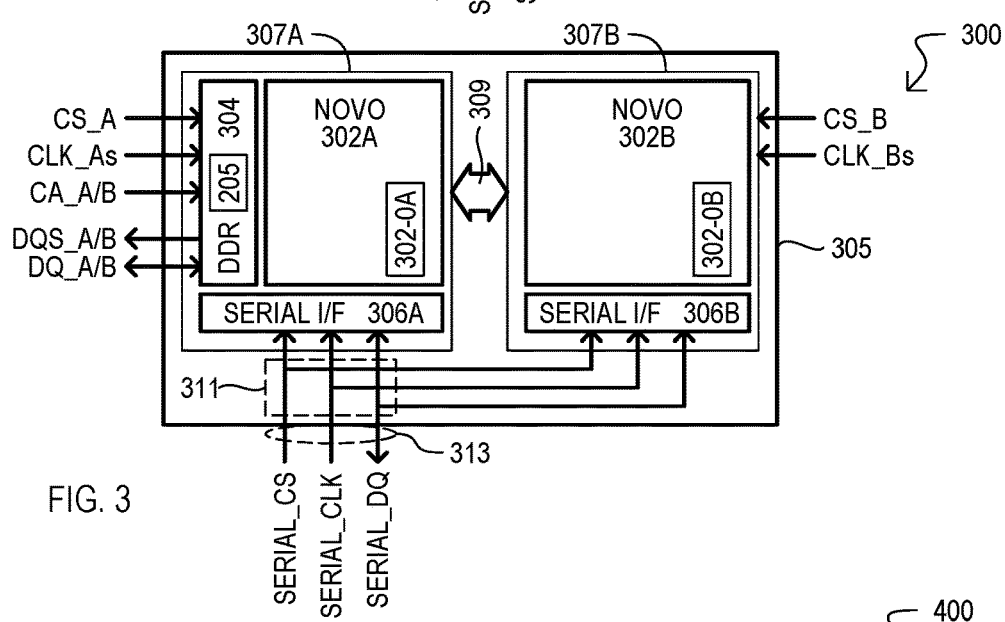
FIG. 3 is a block diagram of a NVM device according to another embodiment.
Figure 4:
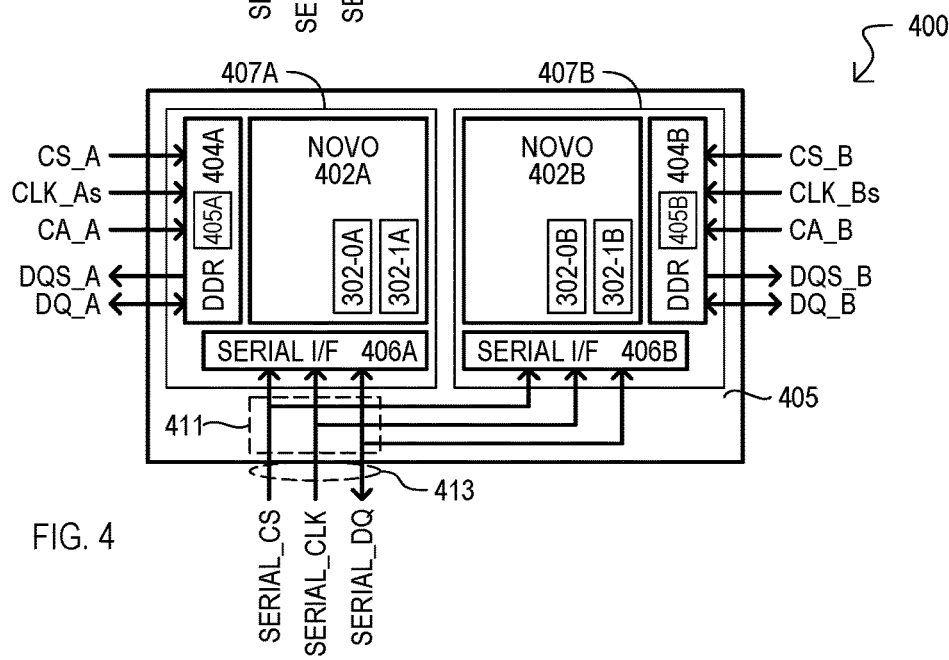
FIG. 4 is a block diagram of a NVM device according to a further embodiment.

While embodiments can take various forms, some embodiments can be single integrated circuit (IC) devices having one or more integrated circuit dice. FIGS. 2 to 4 show three of many possible IC devices according to embodiments.

FIG. 2 is a block diagram of an NVM IC device 200 having a single die 207 formed in an IC package 205. An IC package can take any suitable form, including but not limited to: ball grid array (BGA), including fine pitch BGA (FBGA), small outline package, flat package, pin grid array, or chip carrier. Die 207 can include NVM cell arrays 202, a DDR I/F 204 and a serial I/F 206. NVM cell arrays 202 can take the form of any of those described herein or equivalents. In some embodiments, NVM cell arrays 202 can include a first bank 202-0 and second bank 202-1.

A DDR I/F 204 can include a CS input, clock inputs (CLKs), a CA input, DQ, and a data strobe output (DQS). A DDR I/F 204 can also include a command decoder 205 that can decode express access commands (e.g., NVR1, NVR2 . . . NVRn) as described herein, and equivalents. A DDR I/F 204 can enable access to NVM cell arrays 202, including read and write operations. In some embodiments, in addition to express accesses, DDR I/F 204 can enable standard accesses or can be configured to enable standard accesses. In some embodiments, a command decoder 205 can process consecutive, uninterrupted NVR command sequences (e.g., a first NVR1/NVR2 pair immediately followed by a second NVR1/NVR2 pair) to each of banks 202-0/1, to enable uninterrupted output of data from the banks 202-0/1 on DQ at a double data rate.

A serial I/F 206 can enable accesses to NVM arrays 202 via a serial bus. Serial I/F 206 can include a serial chip select input (SERIAL_CS), serial clock input (SERIAL_CLK), and serial data I/O (SERIAL_DQ). SERIAL_CS can enable NVM device 202 to be selected for access by another device (e.g., host device) via serial I/F 206. SERIAL_CLK can receive a timing signal for synchronizing data inputs to, and data outputs from, the NVM device 202. SERIAL_DQ can receive command, address and data values for accessing storage locations (including configuration registers) of NVM device 202. SERIAL_DQ can output serial data in response to accesses.

FIG. 3 is a block diagram of an NVM IC device 300 having a first die 307A and second die 307B formed in a same IC package 305. An IC package can take any suitable form as described herein. First die 307A can include NVM cell arrays 302A, a DDR I/F 304, and serial I/F 306A, as in the case of FIG. 2. Second die 307B can include NVM cell arrays 302B and serial I/F 306B. First and second die 307A/B can be connected by an internal bus 309. Accesses at DDR I/F 304 can access NVM cell arrays 302A on first die 307A, as well as NVM cell arrays 302B on second die 307B, via internal bus 309. A shared serial bus 311 can enable accesses to either die 307A/B via common serial inputs 313.

A DDR I/F 304 can operate like that of FIG. 2. However, a command decoder 305 can process consecutive, uninterrupted NVR sequences targeted at banks of different dice (e.g., 302-0A/302-0B), to enable uninterrupted output of data from the banks 302-0A/302-0B on DQ_A/B.

FIG. 4 is a block diagram of an NVM IC device 400 having a first die 407A and second die 407B formed in a same IC package 405. NVM IC device 400 can have items like those of FIG. 3. NVM IC device 400 can differ from FIG. 3 in each die 407A/B can each have a DDR I/F 404A/B, each including a chip select input (CS_A/B), clock inputs (CLK_As/Bs), CA inputs (CA_A/B), DQ (DQ_A/B) and DQS (DQS_NB). Each DDR I/F 404A/B can also have its own command decoder 405A/B. In some embodiments, command decoder 405A can process consecutive, uninterrupted NVR sequences targeted at banks 302-0A/1A within NVM cell arrays 402A, and command decoder 405B can process consecutive, uninterrupted NVR sequences targeted at banks 302-0B/1B within NVM cell arrays 402B.

In the embodiments of FIGS. 2 to 4, a DDR I/F (any of 204, 304, 404A, 404B) can have signaling compatible with a DDR standard promulgated by JEDEC. In some embodiments, such a DDR I/F can be compatible with the LPDDR4 standard promulgated by JEDEC.

In the embodiments of FIGS. 2 to 4, a serial I/F (any of 206, 306A/B, 406A/B) can be compatible with a Serial Peripheral Interface (SPI) standard, including those with one serial data line or multiple serial data lines (e.g., quad SPI).

Figure 5:
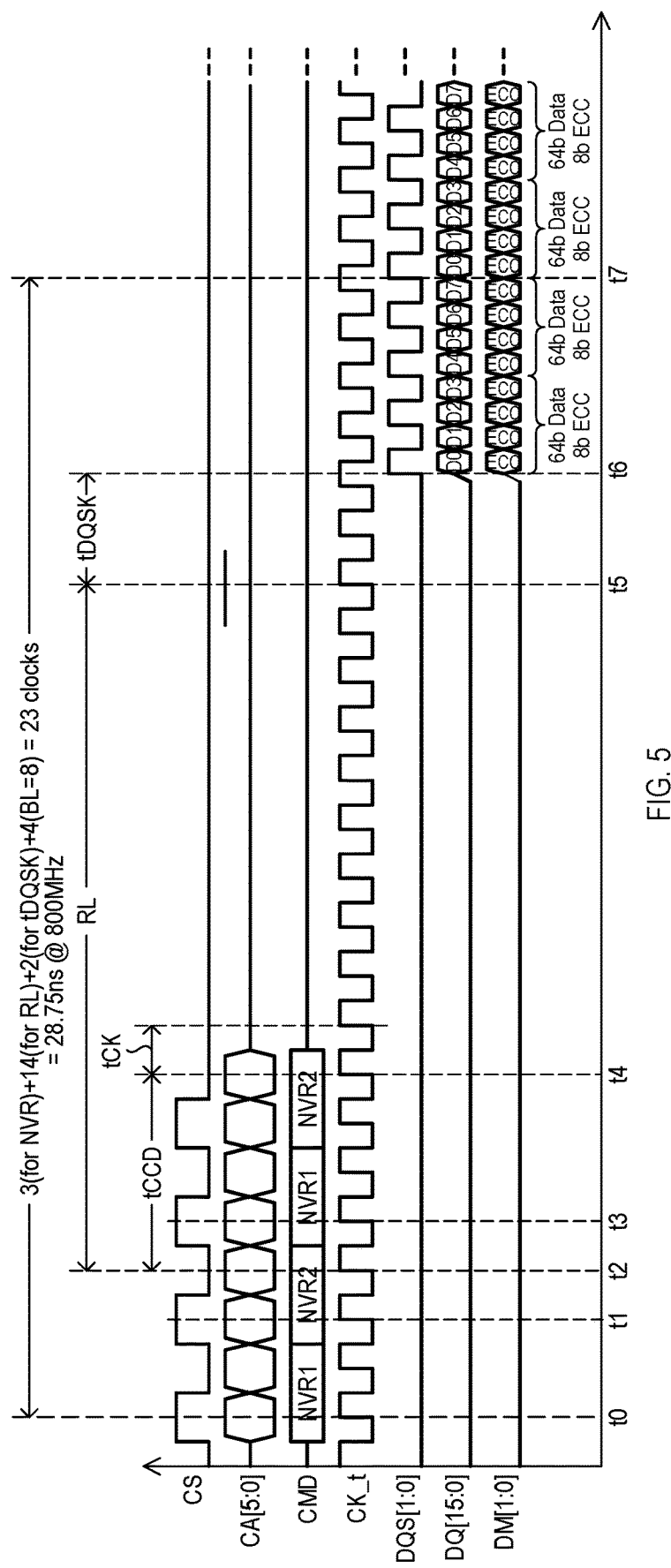
FIG. 5 is a timing diagram of an express access operation to an NVM device according to an embodiment.

FIG. 5 is a timing diagram showing express read operations for a NVM device according to an embodiment. In FIG. 5 it is assumed that accesses can occur over a DDR interface having inputs compatible with the LPDDR4 PHY standard. However, the DDR interface is capable of processing express access commands which can include a command sequence of fewer commands than conventional LPDDR4 accesses. FIG. 5 shows the following waveforms: CS shows a chip select (CS) input; CA[5:0] shows a command-address input (having a bit width of six bits); CMD is a written representation of instruction data received on CA; CK_t is a timing clock; DQS[1:0] shows a data strobe output; DQ[15:0] shows a data I/O having a bit width of 16 bits; and DM[1:0] shows an output configured to provide error correction code (ECC) data corresponding to the data output on DQ.

At time t0, CS can be high, selecting the NVM device for an access operation. Also at time t0, NVM device can start to receive a command sequence on CA for a first express read operation. Such a command sequence can take the form of a first NVR command (NVR-1) received over one clock cycle (of CK_t) followed by a second NVR command (NVR-2) received over another clock cycle. However, it is understood that alternate embodiments can include sequences of more than two NVR commands.

At time t1, CS can again be high, continuing to select the NVM device for an access operation.

At time t2, a first access can be complete with a first command sequence being completed after about three clock cycles. In response to the command sequence, NVM device can begin to access NVM cells for the requested read data.

At time t3, CS can again be high, continuing to select the NVM device for an access operation. Also at time t3, a second express access operation can begin. The second access operation can occur in the same fashion as the first access operation.

At time t4, a second access can be complete with a second command sequence being received over four clock cycles. In response to the second command sequence, NVM device can start to access NVM cells for the second set of read data. A time t2-t4 can be a column-to-column delay time (tCCD), which can be four clocks.

Time t5 can mark the end of a read latency (RL) time, which can vary according to clock speed and NVM device architecture. In the embodiment shown, RL can be 14 clock cycles.

At time t6, following the RL time and an additional clock skew delay (tDQSK), read data for the first access (D0-D7) can be output on DQ along with corresponding data strobe signals DQS. Read data can be output at a double data rate with respect to CK_t, and can have a burst length (BL) of eight. In addition, on output DM, two bits of ECC data can be output with each read data value. In the embodiment shown, over each of the two clock cycles following t6, DQ/DM can output 64 bits of read data with 8 bits of ECC data.

At time t7, the read data for the second access (D0-D7) can be output on DQ immediately after the read data for the first access. This second set of read data can have the same general format as the first read data.

Referring still to FIG. 5, the sequence of read commands NVR1/NVR2 can take four clock cycles. While FIG. 5 shows a DQ of 16-bits (i.e., x16), it is understood that other embodiments can include accesses of 32-bits (i.e., x32). As but of two of many possible examples, the NVR1/NVR2 commands can be targeted at two NVM devices, each of which returns x16 bits. Alternatively, the NVM device can have a x32 bit output. Thus, while FIG. 5 shows data output at x16 bits every half clock cycle, in a two device/bank configuration, data can be output at x32 bits over eight half clock cycles. In such an arrangement, two NVM devices (or one NVM device with a x32 DQ) can output 32 bytes of data over four clocks. Such read operations can be pipelined (i.e., FIG. 5 shows two read operations pipelined, but larger numbers or read operations can be pipelined). In many systems, cache memory accesses write data to cache lines having a size of 32 bytes. Accordingly, each pipelined NVR read accesses can fill one cache line, with no wasted data.

As shown in FIG. 5, the time between the start of an express read command (t0) and all data being output (t7) can include three clock cycles for the command-address data (NVR1/2), 14 clock cycles for RL, 2 clock cycles for tDQSK, and four clock cycles for the data (at BL=8). At an 800 MHz clock speed, the total amount of time can be 28.75 ns. Thus, using pipelined express read accesses, a first cache line can be filled with data from a nonvolatile memory in 28.75 ns, with subsequent cache lines being filled every 5 ns (i.e., four clock cycles). This is in sharp contrast to the conventional access operation of FIG. 19, which takes 38.75 ns for a first cache line, and 10 ns for each subsequent operation, and discards 32 bytes from each read data set.

While FIG. 5 shows an embodiment with a BL of eight, embodiments can also support larger BL sizes. In some embodiments, a BL of eight can be a selectable feature among other BL sizes (such as 32). Further, other embodiment can provide BL sizes greater than eight, such as 16, and not support short BL sizes of eight.

Figure 6:
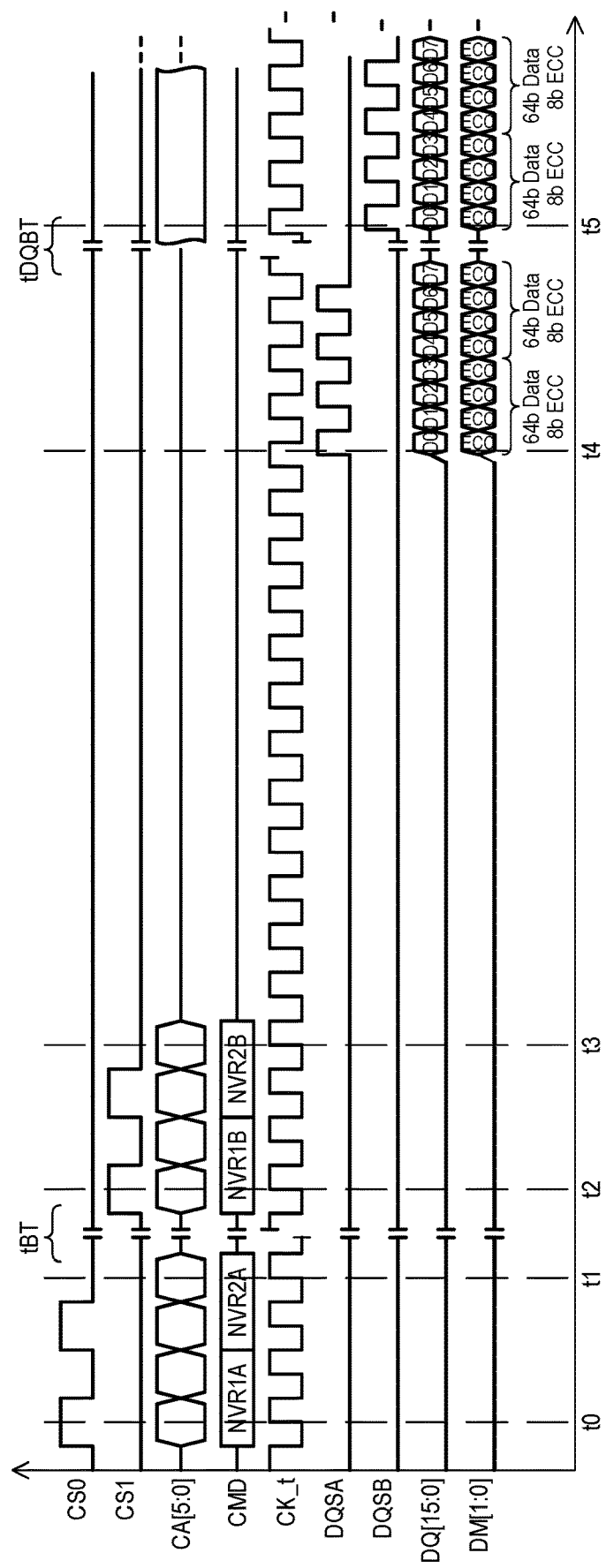
FIG. 6 is a timing diagram of an express access operation to an NVM device according to another embodiment.

FIG. 6 is a timing diagram showing access operation for a NVM device according to another embodiment. FIG. 6 shows an access to over a DDR interface, like that of FIG.

5, but targeted at two different NVM devices. FIG. 6 shows waveforms like those of FIG. 5, except there can be two chip select waveforms CS0 and CS1. Further, there can be two different data strobe signals DQSA, DQSB.

Operations can occur in the same general fashion as shown in FIG. [6] 5, however, a first NVM device can be selected between times t0 and t1 with signal CS0 and a second NVM device can be selected between times t2 and t3 with signal CS1. In some embodiments, there can be a time tBT separating an NVR sequence (NVR1A/NVR2A) for one device and an NVR sequence (NVR1B/NVR2B) for a next device. A time tBT can vary according type of device and clock speed. As but a few of many possible examples, at an 800 MHz clock speed, tBT can be two clock cycles (of CK_t), and at a 1600 MHz clock speed tBT can be four clock cycles. Data output on DQ between times t4 and t5 can be from a first NVM device, while data output on DQ after time t5 can be from a second NVM device. In some embodiments, there may be a time tDQBT separating the data sets.

Figure 7:
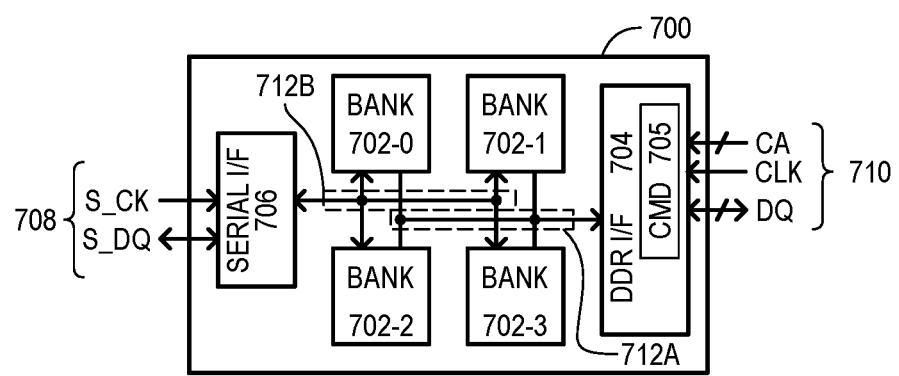
FIG. 7 is a block diagram of a NVM device having a double data rate (DDR) parallel interface (I/F) and a serial I/F according to an embodiment.

FIG. 7 is a block diagram of a NVM device 700 according to another embodiment. NVM device 700 can be one implementation of devices and dice shown in other embodiments. A NVM device 700 can include a first interface 704, a second interface 706, and a number of separately addressable banks 702-0 to -3. A first I/F 710 can be a parallel DDR I/F which can receive command sequences at a CA input, and provide parallel output data on data output DQ in synchronism with rising and falling edges of a clock CLK. A first interface 710 can be connected to a parallel data bus 710. Parallel data bus 710 can have command and address values transmitted over a CA bus that is separate from a data bus DQ on which data can be output (or input). In some embodiments, signaling at a first I/F 710 can be compatible with the LPDDR4 standard. A first I/F 710 can also include a command decoder 705 for processing express accesses as described herein and equivalents.

A second I/F 706 can be a serial I/F which can enable serial data transactions on one or more serial data I/Os (S_DQ) in synchronism with a serial clock S_CK. Second I/F 706 can be connected to a serial bus 708. In some embodiments, a second I/F 712 can be compatible with an SPI standard.

Banks (702-0 to -3) can each include a number of NVM cells. Within each bank (702-0 to -3) NVM cells can be arranged into one or more arrays. NVM cells can take any suitable form, and in some embodiments can be "flash" type NVM cells. Banks (702-0 to -3) can be separately addressable. That is, a physical addressing of device 700 can have a separate bank address for each bank (702-0 to -3). All banks (702-0 to -3) can be connected to a first bus system 712A and a second bus system 712B. First bus system 712A can connect banks (702-0 to -3) to first I/F 704 and second bus system 712B can connect banks (702-0 to -3) to second I/F 706. While FIG. 7 shows a device with four banks, embodiments can include greater or fewer numbers of banks. In some embodiments, bank addressing can enable pipelined access to NVM device with express access commands (e.g., command pairs NVR1/NVR2). Command sequences for different banks can be received at first interface 704 in a pipelined fashion (i.e., no intervening data between command address values, and minimum or no delay between command address values). In response to such pipelined command sequences, data from different banks can be output on DQ in sequential bursts, with a minimum or no delay between such bursts.

Figure 8:
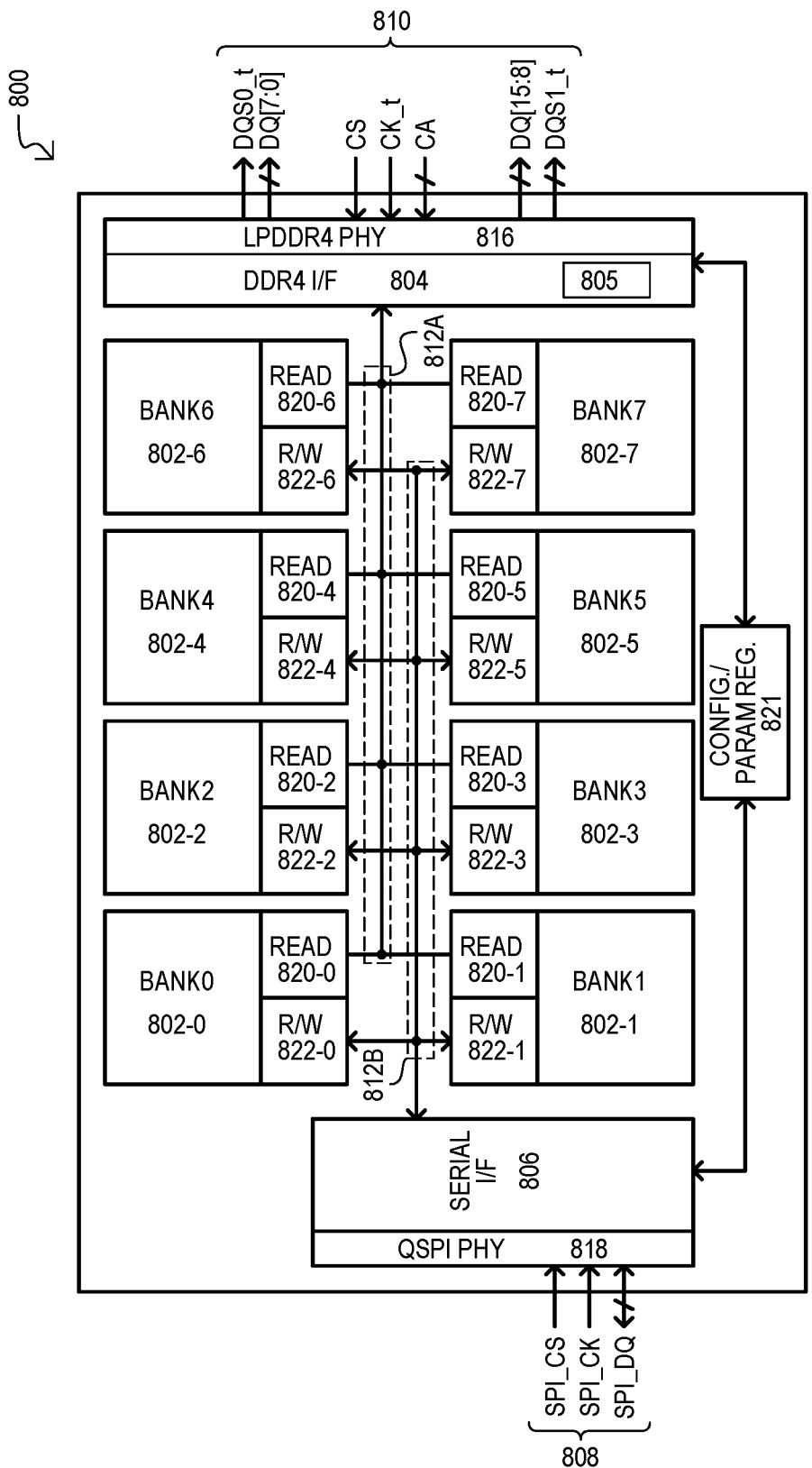
FIG. 8 is a block diagram of a NVM device having a DDR parallel interface I/F and a serial I/F according to another embodiment.

FIG. 8 is a block diagram of a NVM device 800 according to a further embodiment. NVM device 800 can be one implementation of any of those shown herein. NVM device 800 can include a DDR4 I/F 804, a quad SPI (QSPI) compatible I/F 806, a LPDDR4 compatible physical layer interface (PHY) 816, a QSPI compatible PHY 818, multiple banks 802-0 to -7, a first access path 820-0 to -7 for each bank (802-0 to -7), a second access path 822-0 to -7 for each bank (802-0 to -7), and parameter/configuration registers 821.

LPDDR4 PHY 816 can include a chip select CS input, a clock input CK_t, CA input, a first DQ[7:0] with corresponding data clock output DQS0_t, and a second DQ[15:8] with corresponding data clock output DQS1_t. Such inputs and outputs can be connected to an LPDDR4 compatible bus 810. DDR4 I/F 804 can process command an and address data, and can include command decoder 805 that can process express access command-address values that can be received in a command sequence (e.g., NVR1 . . . NVRn), with each command of the sequence being received over no more than two cycles of CK_t. In some embodiments, DDR4 I/F 804 can also process LPDDR4 compatible commands (e.g., command address data received over eight clocks). In some embodiments, DDR4 I/F 804 can be a read only interface with respect to user storage space accesses that does not process write commands to user storage space. In some embodiments, DDR4 I/F 804 can process write operations to configuration and/or other registers of a NVM device 800.

DDR4 I/F 804 can be connected to the banks (814-0 to -7) via a first bus system 812A. DDR4 I/F 804 can process pipelined express access commands every four clock cycles to provide corresponding output data in bursts of eight, at a double date rate on DQ. In some embodiments, such consecutive pipelined express access commands can be to different banks 802-0 to -7.

QSPI PHY 818 can include a serial chip select SPI_CS, a serial clock input SPI_CK, and four serial data I/Os SPI_DQ. Such I/Os can be connected to a SPI compatible serial bus 808. QSPI I/F 806 can process commands received at QSPI PHY 818, including QSPI compatible commands. Such commands can include both read and write (e.g., program, erase) commands.

A parameter/configuration register 821 can store parameter values accessible by other devices which can indicate the capabilities of the NVM device 800. In some embodiments, register 821 can store a parameter value that indicates the NVM device 800 can execute express access operations.

Each bank (802-0 to -7) can include NVM cells arranged into rows and columns. Each bank (802-0 to -7) can be separately accessible via a unique bank address. In some embodiments, NVM cells can be group erasable (e.g., flash type cells). Read paths (820-0 to -7) can enable read accesses to their corresponding bank (802-0 to -7) from DDR4 I/F 804 via first bus system 812A. In some embodiments, read paths (820-0 to -7) can also be write paths, enabling write data to be written into banks (802-0 to -7) from DDR2 I/F 804. RAN paths (822-0 to -7) can enable read or write accesses to their corresponding bank (802-0 to -7) from QSPI I/F 806 via second bus system 812B.

According to embodiments, a NVM device can include an address space of storage locations for user data, as well as data particular to the NVM device. Such an address space can include locations for parameter data indicating express access capability and/or configuration data for configuring the NVM device for express access operations.

Figure 9:
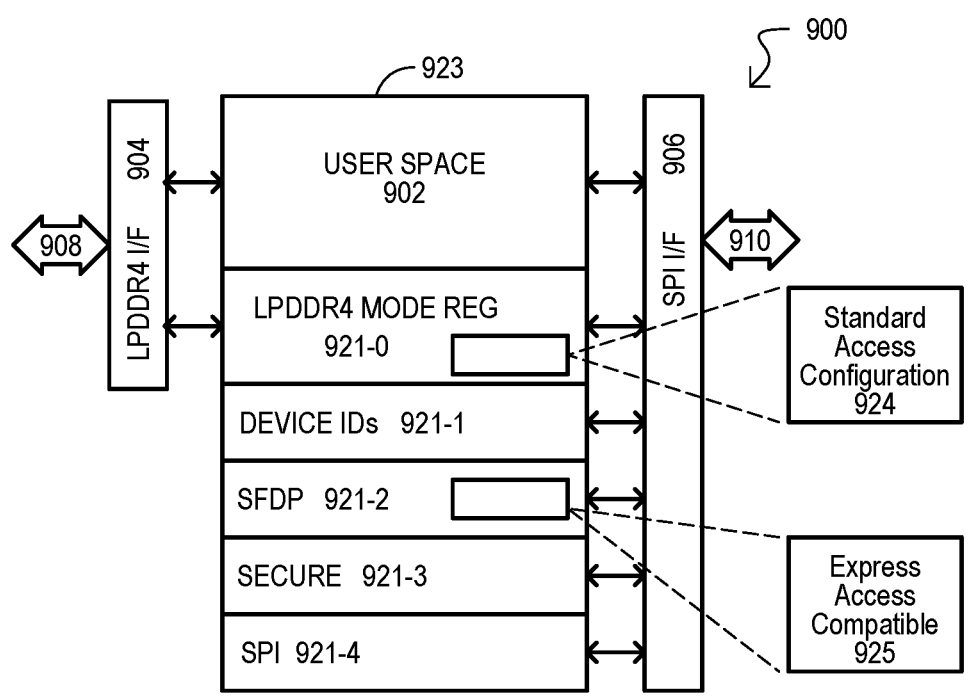
FIG. 9 is a block diagram showing a NVM device address space according to an embodiment.

FIG. 9 shows a NVM device 900 having an address space 923, LPDDR I/F 904 that can connect to a parallel bus 908, and a serial I/F 906 that can connect to a serial bus 910.

LPDDR4 PHY 904 can be compatible with a LPDDR4 standard PHY. Serial I/F 906 can be compatible with a SPI standard.

Address space 923 can include various storage locations accessible by a predetermined address. In some embodiments, NVM device 900 can have logical-to-physical address translation and/or address reconfiguration capabilities for wear leveling, as but one example. In the embodiment shown, an addressable space 923 can include a user space 902 and any of: a LPDDR4 mode registers 921-0, device identification (ID) registers 921-1, device parameter registers 921-2, secure regions 921-3, and serial I/F registers 921-4. User space 902 can include NVM cell arrays for storing user data in a nonvolatile fashion and can be accessed via LPDDR4 I/F 904 and SPI I/F 906.

LPDDR4 mode registers 921-0 can store values for configuring LPDDR4 I/F 904. In some embodiments, LPDDR4 mode registers 921-0 can include registers for establishing BL size, including short BL sizes such as eight, and/or larger BL sizes including but not limited to 16 or 32. In some embodiments, a LPDDR4 mode register 921-0 can include standard access configuration register 924. According to a value stored in express access control register 924, a NVM device 900 may execute sequences of standard access commands, which can include more commands than an express access. In some embodiments, NVM device 900 can execute express accesses by determining if consecutive commands are NVR commands. A standard access configuration register 924 can enable LPDDR4 command sequences of four commands in addition to express commands. LPDDR4 mode registers 921-0 can be accessible via a LPDDR4 I/F 904 or a SPI I/F 906.

Device ID registers 921-1 can store values that can identify the NVM device 900 to other devices in a system. In some embodiments, a value stored in device ID registers 920-1 can indicate that the NVM device can execute express access commands. Parameter registers 921-2 can store values that can identify capabilities of the NVM device 900 to other devices in a system. In some embodiments, parameter registers 921-2 can include an express access parameter register 925 that can indicate that the NVM device can execute express access commands. Other devices (i.e., host and/or memory controller) can access parameter registers 921-2 and/or device ID registers 921-1 to determine that NVM device 900 can execute express access commands.

Secure regions 920-3 can store data values that are not accessible by devices external to NVM device or are only accessible through a secure access procedure such as an authentication process. Any or all of DDR I/F registers 920-0, device ID registers 920-1, parameter registers 920-2 and serial I/F registers 920-3 can be secure regions.

Serial I/F registers 921-4 can store values for configuring serial I/F 906. In some embodiments, device ID registers 921-1, parameter registers 921-2 and serial I/F registers 921-4 can be accessed via serial I/F 906 but not via DDR I/F 904.

FIG. 10A shows one example of DDR I/F registers 1021-1 that can be included in a NVM device according to an embodiment. DDR I/F registers 1021-1 can include various registers for configuring a DDR I/F, including an express access control register 1024. An express access control register 1024 can store a value which can control various features of express access operations, including but not limited to: a number of clock cycles in a received command, any delay between back-to-back accesses (e.g., tBT), a burst length for data, etc.

FIG. 10B shows one example of parameter registers 1021-2 that can be included in an NVM device according to an embodiment. Parameter registers 1021-2 can include various registers for indicating parameters of a NVM device, including a standard access compatible register 1025. A standard access compatible register 1024 can be accessed by another device (e.g., host or controller) to indicate that a NVM device can execute standard accesses, which can require longer command sequences than express accesses, as described herein and equivalents.

Of course, configuration or parameter registers can take any form suitable for the architecture of the NVM device.

FIG. 10C is a diagram showing the format of a conventional LPDDR4 read command 1035. A conventional read command 1035 can include a first portion 1035H that is received when CS is high (and during a first clock cycle) and a second portion 1035L that is received when CS is low (and during a second clock). Conventional read command 1035 can include bit locations that store command data (CMD). The bit locations correspond to CA bus bits CA0 and CA1 during the first clock cycle. An LPDDR4 command sequence can include four commands ACT1, ACT2, READ and CAS having this format.

FIG. 10D is a diagram showing the format of a NVR command 1039 according to an embodiment. NVR command 1039 can have the same format as conventional LPDDR4 command, including six bits received on two clock cycles. A NVR command 1039 can differ from a conventional LPDDR4 command in that a bit location that provides command data in the LPDDR4 command (e.g., 1037 in FIG. 10C) can provide address information 1041 in a NVR command. While FIG. 10D shows CA1 providing address data, in other embodiments CA0 could provide address data (while CA1 provides command data). As noted herein, a command sequence for an express access operation can include two or three NVR commands in contrast to the four commands required by a conventional LPDDR4 read operation.

Figure 11A:
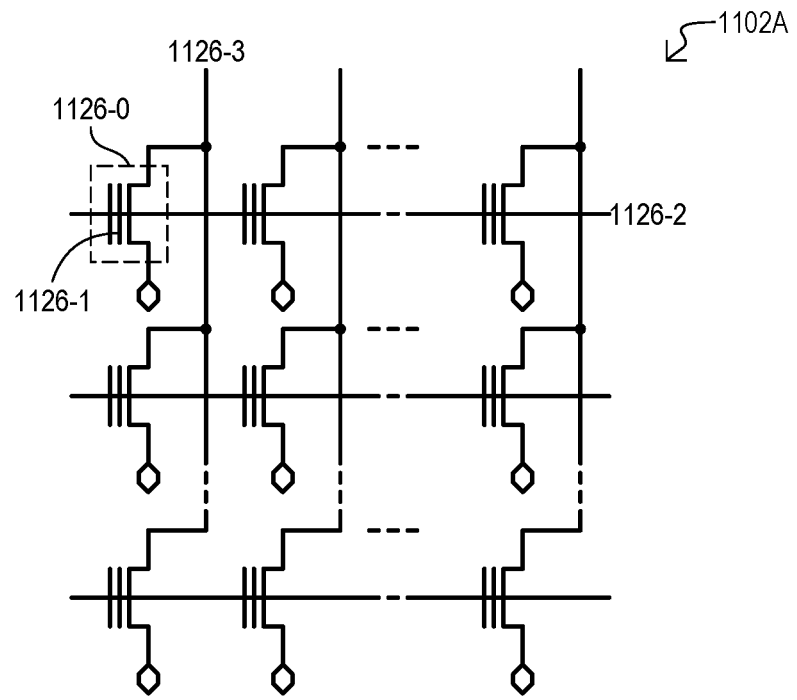
FIGS. 11A and 11B are schematic diagrams memory cell arrays that can be included in embodiments.

While embodiments can include any suitable NVM array structure or NVM cell type, some embodiments can include 1-transistor (1T) NOR type arrays. FIG. 11A is a schematic diagram of a 1T NOR array 1102 that can be included in embodiments. Array 1102A can include a number of memory cells (one shown as 1126-0) arranged into rows and columns, with memory cells of a same row being connected to a same word line (one shown as 1126-2) and memory cells of a same column being connected to a same bit line (one shown as 1126-3). In some embodiments, memory cells (1126-0) can be formed with a single transistor structure, having a charge storing structure 1126-1 between a control gate and a channel. A charge storing structure 1126-1 can store one or more bits of data as charge (including absence of charge). A charge storing structure 1126-1 can take any suitable form including but not limited to: a floating gate, a charge storing dielectric (e.g., replacement gate), or a combination thereof.

Figure 11B:
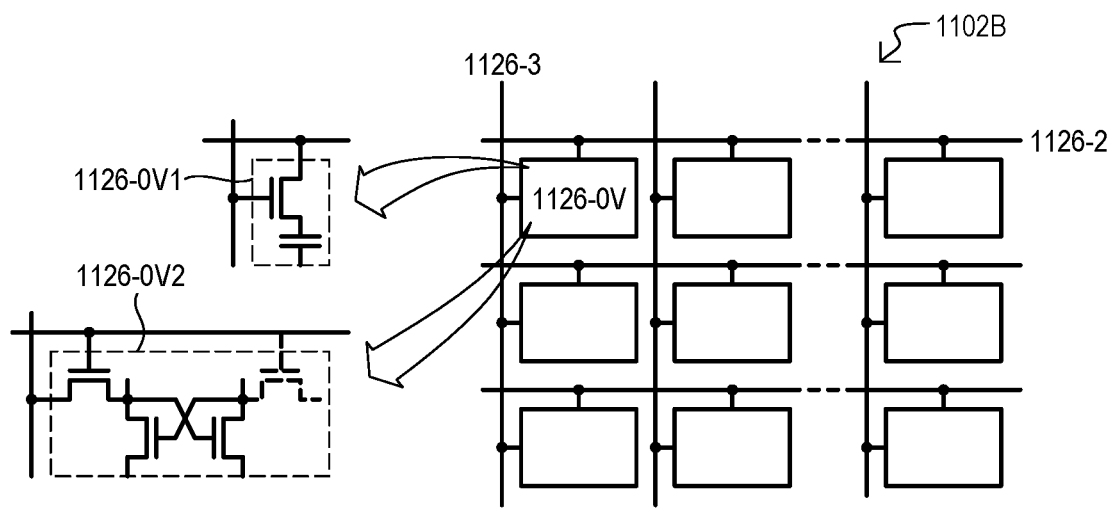

Embodiments can also include any suitable volatile array structure or volatile memory cell type. FIG. 11B is a schematic diagram of possible volatile memory cells arrays that can be included in embodiments. FIG. 11B shows an array 1102B that can include a number of volatile memory cells (one shown as 1126-0V) arranged into rows and columns and connected to one or more bit lines (e.g., 1126-3) and word lines (e.g., 1126-2). Volatile memory cells (1126-0V) can take any suitable form, including but not limited to DRAM cells 1126-0V1 and/or SRAM cells 1126-

0V2. SRAM cells 1126-0V2 can include, but are not limited to, 4-transistor (4T), 6T and/or 8T variations.

In some embodiments, express read commands (NVR1/NVR2) can be used to access volatile memory cells in the same fashion as NVM cells as described herein. In some embodiments, a memory device can include both NVM cells and volatile memory cells, both of which can be accessed by express read commands. In other embodiments, a memory device can receive express access commands that only access volatile memory cells.

Figure 12:
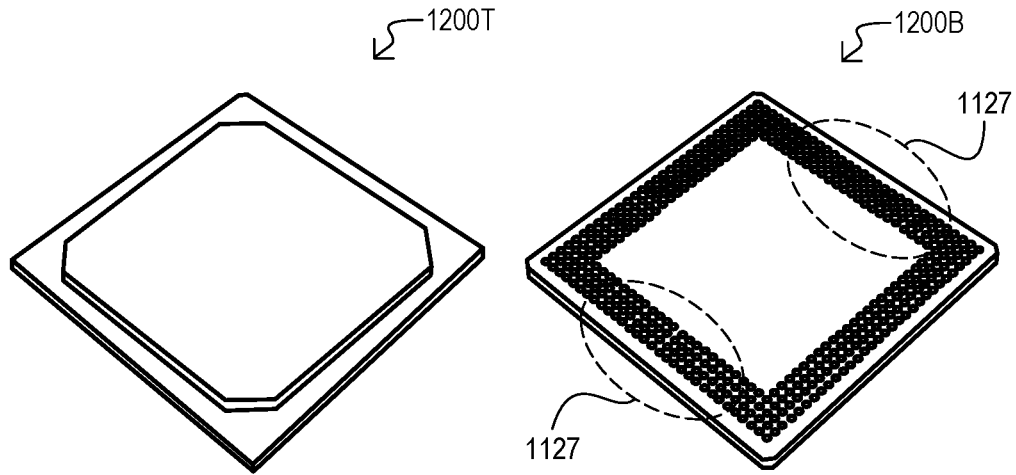
FIG. 12 shows perspective views of an integrated circuit device according to an embodiment.

While embodiments can include systems with memory devices operating in conjunction with a host device, embodiments can also include standalone NVM devices having a parallel I/F formed in one IC package. Such an embodiment is shown in FIG. 12. FIG. 12 shows packaged NVM device in a perspective top view 1200T and bottom view 1200B. NVM device 1200T/B can include a number of physical connections (e.g., 1127) all or a portion of which can be connected to a DDR I/F as described herein. Such a DDR I/F can process express access commands, as described herein and equivalents. However, it is understood that memory devices according to embodiments can include any other suitable package type, including direct bonding of a memory device die onto a system circuit board substrate.

Figure 13:
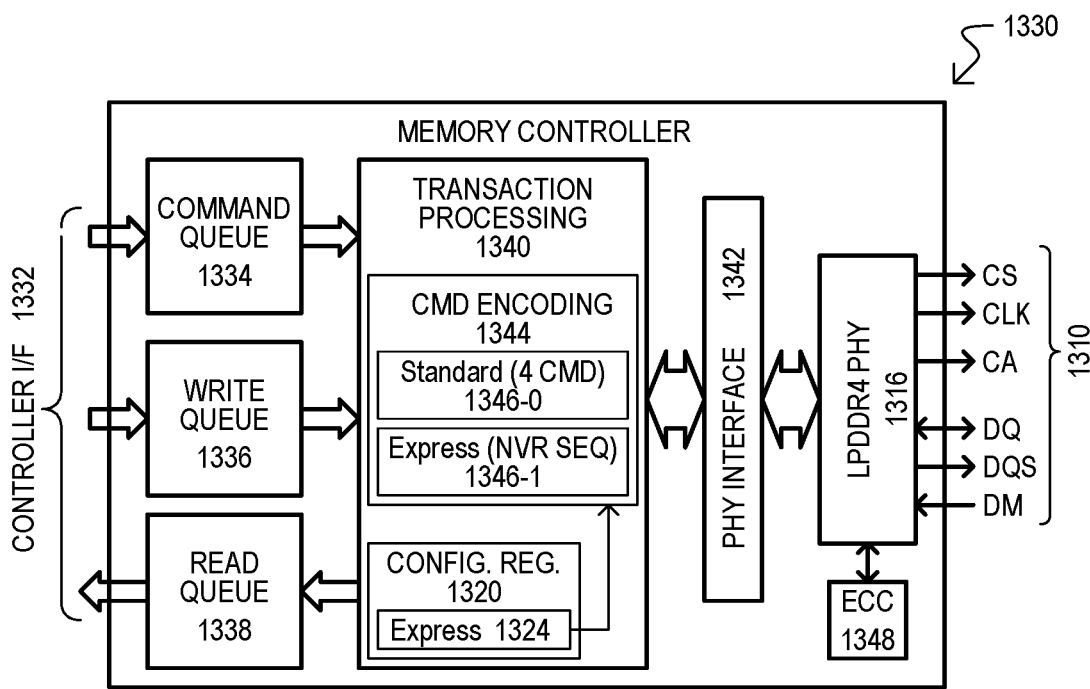
FIG. 13 is a block diagram of a memory controller according to an embodiment.

While embodiments can include NVM devices, embodiments can also include memory controllers that can generate express command and address values over a DDR I/F for NVM devices. FIG. 13 shows a memory controller 1330 according to an embodiment.

A memory controller 1330 can include a command queue 1334, a write queue 1336, a read queue 1338, transaction processing circuits 1340, a PHY interface circuit 1342, a LPDDR4 PHY 1316 and ECC circuits 1348. A command queue 1334, a write queue 1336, a read queue 1338 can be connected to a controller I/F 1332, which can be connected to a controller (e.g., host processor) or the like. A command queue 1334 can receive memory request over controller I/F 1332 to access a NVM device connected to a LPDDR4 compatible bus 1310. A write queue 1336 can receive write data to be programmed into an NVM device over LPDDR4 PHY 1316. A read queue 1338 can output read data received from an NVM device over LPDDR4 PHY 1316. Transaction processing circuits 1340 can include command encoding circuits 1344 and a configuration register 1320. Command encoding circuits 1334 can include standard encoding 1346-0 and express encoding 1346-1. Standard encoding 1346-0 can encode memory requests into formats compatible with the LPDDR4 standard (e.g., sequences of four commands transmitted over eight clocks). Express encoding 1346-1 can encode memory requests into express access format (e.g., sequences of one or more consecutive NVR commands). In some embodiments, encoding of commands between different formats (e.g., standard/express) can be in response to requests received over command queue 1334. That is, a request from a controller can indicate if the access is to take a standard or express format. In addition or alternatively, encoding of commands can be controlled according to an express encoding register value 1324 stored in configuration register 1320.

A PHY I/F circuit 1342 can generate input signals from command and address values for appropriate signaling by LPDDR4 PHY 1316 and can organize data values from signals received at LPDDR4 PHY 1316. LPDDR4 PHY 1316 can be connected to a LPDDR4 bus 1310 to transmit signals and receive data, including transmitting command-address values for express access operations, and receiving read data from express accesses. ECC circuit 1348 can perform error detection and correction operations on data values received at LPDDR4 PHY 1316. In some embodiments, ECC circuits 1348 can use ECC values received on DM inputs of LPDDR4 bus 1310.

Figure 14:
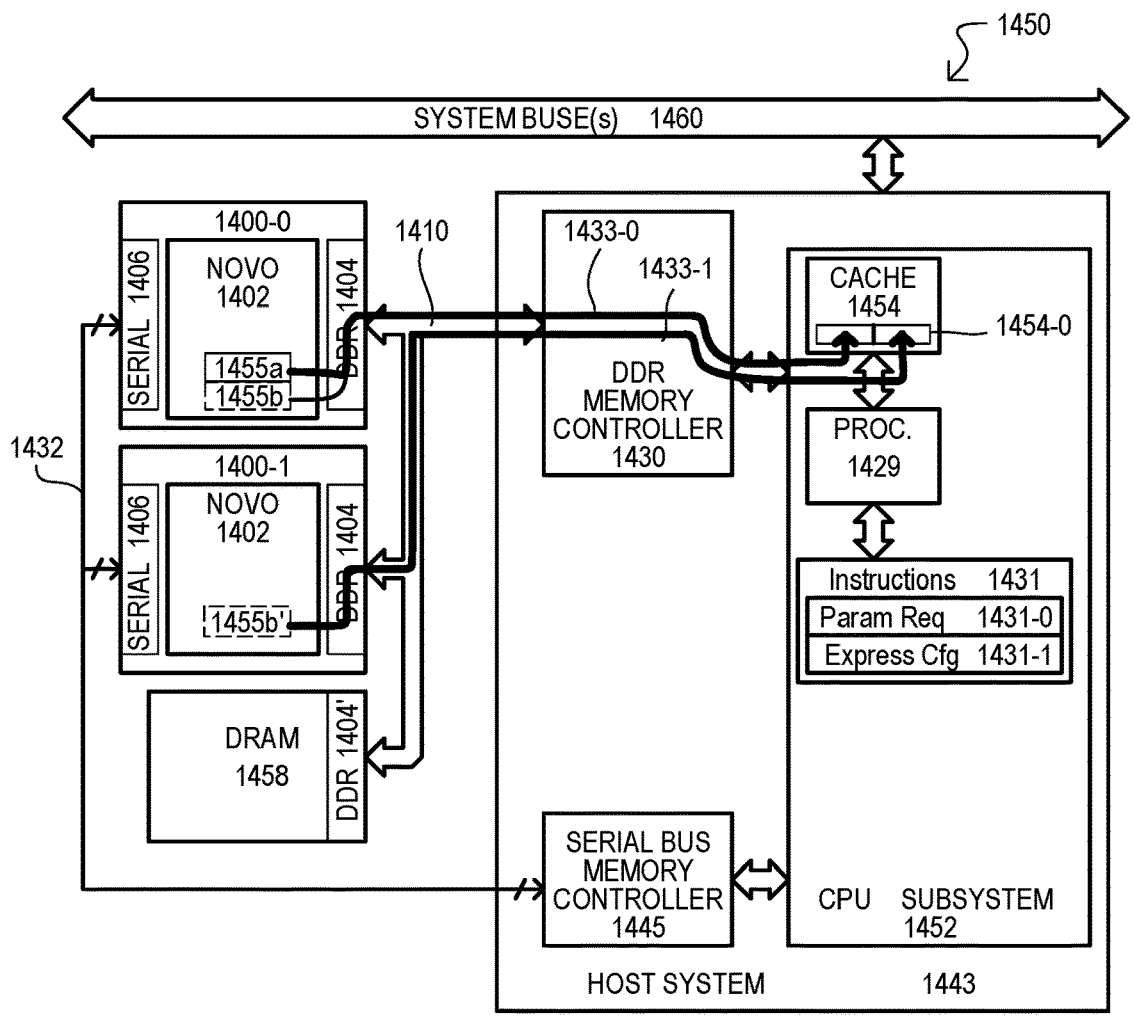
FIG. 14 is a block diagram of a system according to an embodiment.

Embodiments can also include systems that can use express access operations to a NVM device to fill cache memory lines of a controller device, such as a system or host CPU. FIG. 14 shows a system 1450 according to such an embodiment.

A system 1450 can include one or more NVM devices (two shown as 1400-0, 1400-1), a host system 1443, and optionally, a dynamic random access memory (DRAM) device 1458. NVM devices 1400-0/1 can include NVM arrays 1402, a DDR I/F 1404 and a serial I/F 1406. NVM devices 1400-0/1 can be connected to a DDR bus 1410 via DDR I/Fs 1404 and to a serial bus 1432 via serial I/Fs 1406. NVM devices 1400-0/1 can be capable of executing express access operations as described herein or equivalents.

A host system 1443 can include a DDR memory controller 1430, a CPU subsystem 1452, and a serial bus memory controller 1445. A DDR memory controller 1430 can be connected to DDR bus 1410 and to CPU subsystem 1452. In response to requests from CPU subsystem 1452, DDR memory controller 1430 can generate command sequences over a CA portion of DDR bus 1410, including NVR commands as described herein and equivalents. CPU subsystem 1452 can include one or more processing circuits 1429, instructions 1431 executable by processing circuits 1429 and a cache memory 1454. A serial bus memory controller 1445 can be connected to serial bus 1432. In response to requests from CPU subsystem 1452, serial bus memory controller 1445 can generate serial command and data to access devices on the serial bus 1432, including NVM devices 1400-0/1

Having described various portions of a system 1450, a cache fill operation for the system will now be described.

A cache memory 1454 can be organized into cache lines (one shown as 1454-0) which can be accessed by processing circuits 1429. According to embodiments, a DDR memory controller 1430 can access one or more NVM devices 1400-0/1 with two express read operations to retrieve data for filling a cache line (two shown as 1454-0) without the need to discard any data. In some embodiments, an express read command sequence to one or two NVM devices 1400-0/1 can retrieve an amount of read data equal to a cache line. In some embodiments, each express read command sequence is composed of a command sequence of only two commands. However, as understood from embodiments herein, express command sequences can include fewer or greater numbers of express read (i.e., NVR) commands.

In some embodiments, such cache line fill operations can be to a single NVM device. For example, by way of data path 1433-0, DDR memory controller 1430 can issue an express read sequence to NVM device 1400-0, to access data 1455*a*. Data 1455*a* can be output in a burst sequence and can be equal to a cache line. In some embodiments, such a data bust can be x32 (32 bits wide) and have a burst length of eight to fill a 32 byte cache line.

In some embodiments, express read sequences can be pipelined (e.g., issued with no delay between or no other intervening commands or operations between). As but one example, in a pipelined operation, data 1455*a* and 1455*b* can be output one after the other to fill two cache lines 1454-0 without having to discard any data. In some embodiments, data 1455*a* can be stored in one bank of NVM device 1400-0 and data 1455*b* can be stored in another bank of NVM device 1400-0.

In some embodiments, cache line fill operations can be to different NVM devices. For example, DDR memory controller 1430 can issue an express read sequence to both NVM device 1400-0 and NVM device 1400-1. The express read sequence can access data 1455$a$ and data 1455$b'$. Data 1455$a$ and data 1455$b'$ can equal the size of a cache line. In some embodiments, NVM devices 1400-0 and 1400-1 can each provide x16 data bursts of eight in parallel to fill a 32 byte cache line. Express read operations to multiple devices can be pipelined to output sequential data sets that each fill a cache line.

In some embodiments, a cache fill operation can be to a DRAM device 1458. A DRAM device 1458 can include a DDR interface 1404' compatible with (or programmable to be compatible with) the execution of express read commands.

Referring still to FIG. 14, in some embodiments a CPU subsystem 1452 can include any of: a parameter request procedure 1431-0 and express access configuration procedure 1431-1. Parameter request procedure 1431-0 can request parameter data from NVM devices 1400-0/1 that can identify if such devices are compatible with express access operations. Express access configuration procedures 1431-1 can write data values to configure DDR memory controller 1430 for express access operations.

In some embodiments, DRAM device 1458 can have a DDR interface 1404' that is compatible with express access commands, as noted above. In other embodiments, DRAM DDR I/F 1404' may not be compatible with express access commands.

Figure 15:
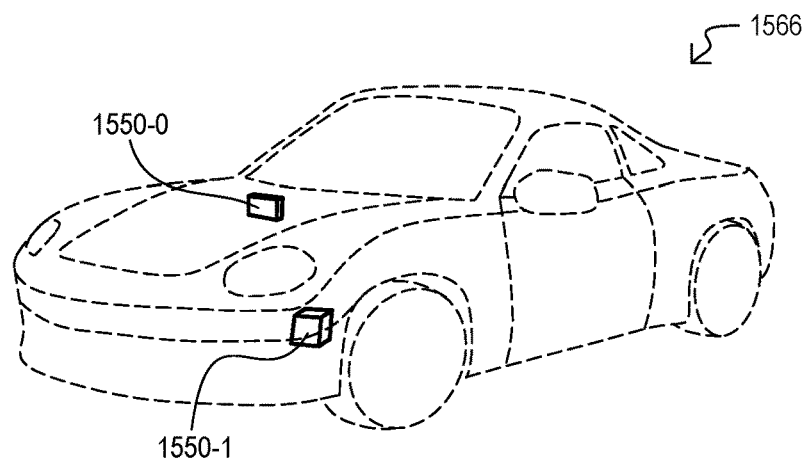
FIG. 15 is a diagram of an automobile system according to an embodiment.

Referring to FIG. 15 an automobile 1566 system according to an embodiment is shown in a diagram. An automobile system 1566 can have numerous sub-systems (two shown as 1550-0 and 1550-1) that operate with host devices (e.g., CPU subsystems) that communicate with one or more NVM devices. Such sub-systems (1550-0, 1550-1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (1200-0, 1200-1) can include a host device that can access NVM devices with express access commands for rapid retrieval of data, as described herein and equivalents. In some embodiments, such accesses can be for fast cache line fills. In some embodiments, host devices can be configured to execute code directly from NVM devices (i.e., execute in place). This is in sharp contrast to conventional systems that can load data (e.g., code) from a conventional NVM device into a volatile memory (e.g., SRAM) for access by a host device.

Figure 16:
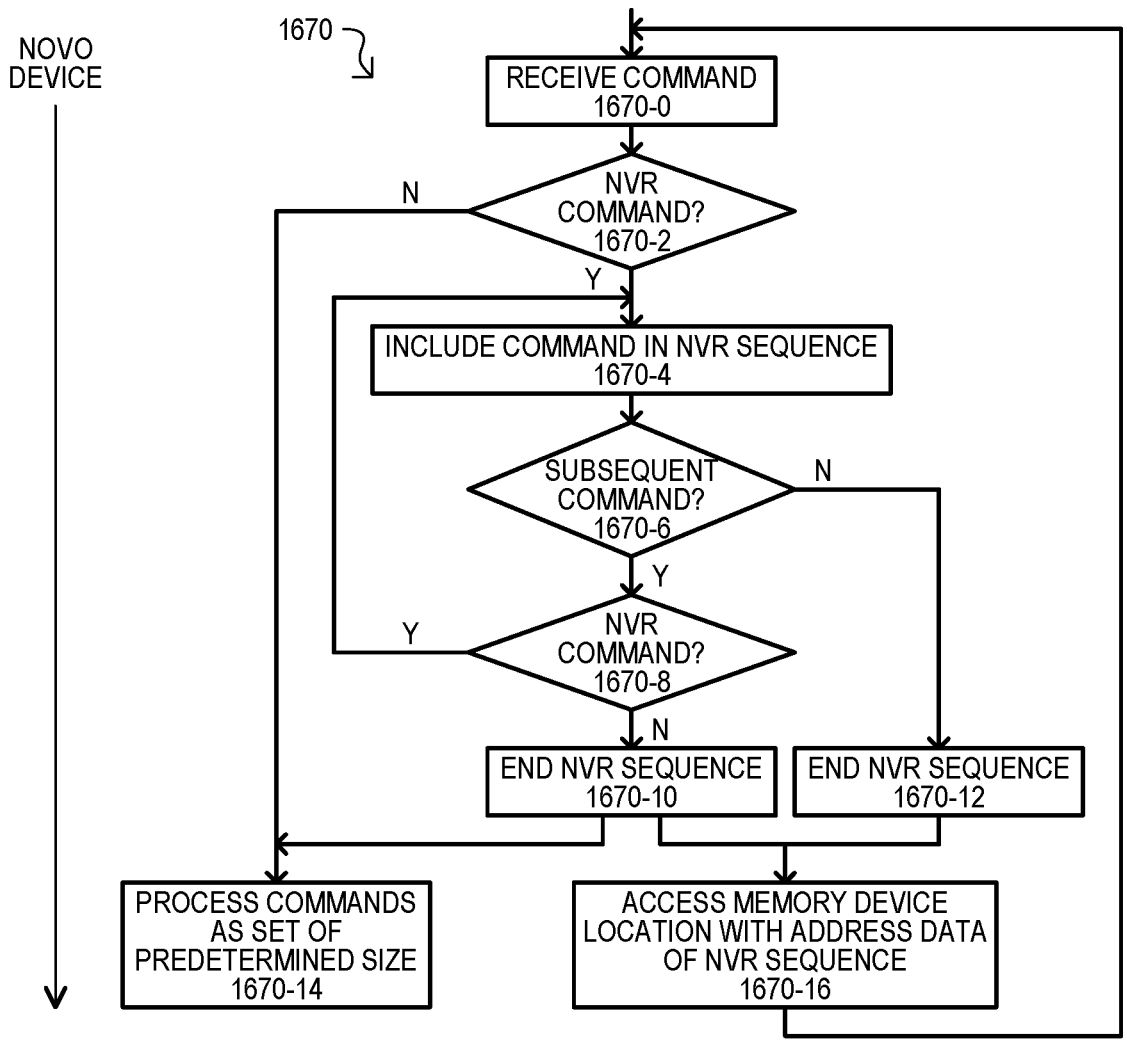
FIG. 16 is a flow diagram of a NVM method according to an embodiment.

While the described devices and systems disclose various methods according to embodiments, additional methods will be described with reference to flow diagrams. FIG. 16 is a flow diagram of a method 1670 for executing express access commands by a NVM device according to an embodiment. A method 1670 can include receiving a command 1670-0. Such an action can include receiving a command from a command address (CA) input of the NVM device. A method 1670 can determine if a received command is an NVR command 1670-2. Such an action can include determining if certain bit locations of the command identify the command as an NVR command. If a command is not an NVR command (N from 1670-2), a method 1670 can process commands as a set of predetermined size (1670-14). Such an action can include processing commands as if they are a set of four commands, rather than an NVR sequence of variable size.

If a received command is determined to be an NVR command (Y from 1760-2), a method 1670 can determine if a subsequent command is received 1670-06. Such an action can include receiving a command with substantially no delay with respect to a previously received command. If no subsequent command is received (N from 1670-6) an NVR sequence can end 1670-12. In this way, an NVR command sequence of one or more NVR commands can be determined.

If a subsequent command is received (Y from 1670-6), a method 1670 can determine if the subsequent command is an NVR command 1670-8. If the subsequent command is an NVR command (Y from 1670-8), a method 1670 can return to 1670-4 and the subsequent NVR command can be added to the NVR sequence. If the subsequent command is not an NVR command (N from 1670-8), an NVR sequence can end 1670-10 and the non-NVR command can be processed as a predetermined set (1670-14).

When an NVR command sequence has ended (1670-10 or 1670-12), a method 1670 can access a memory device location with address data or the NVR sequence.

Figure 17:
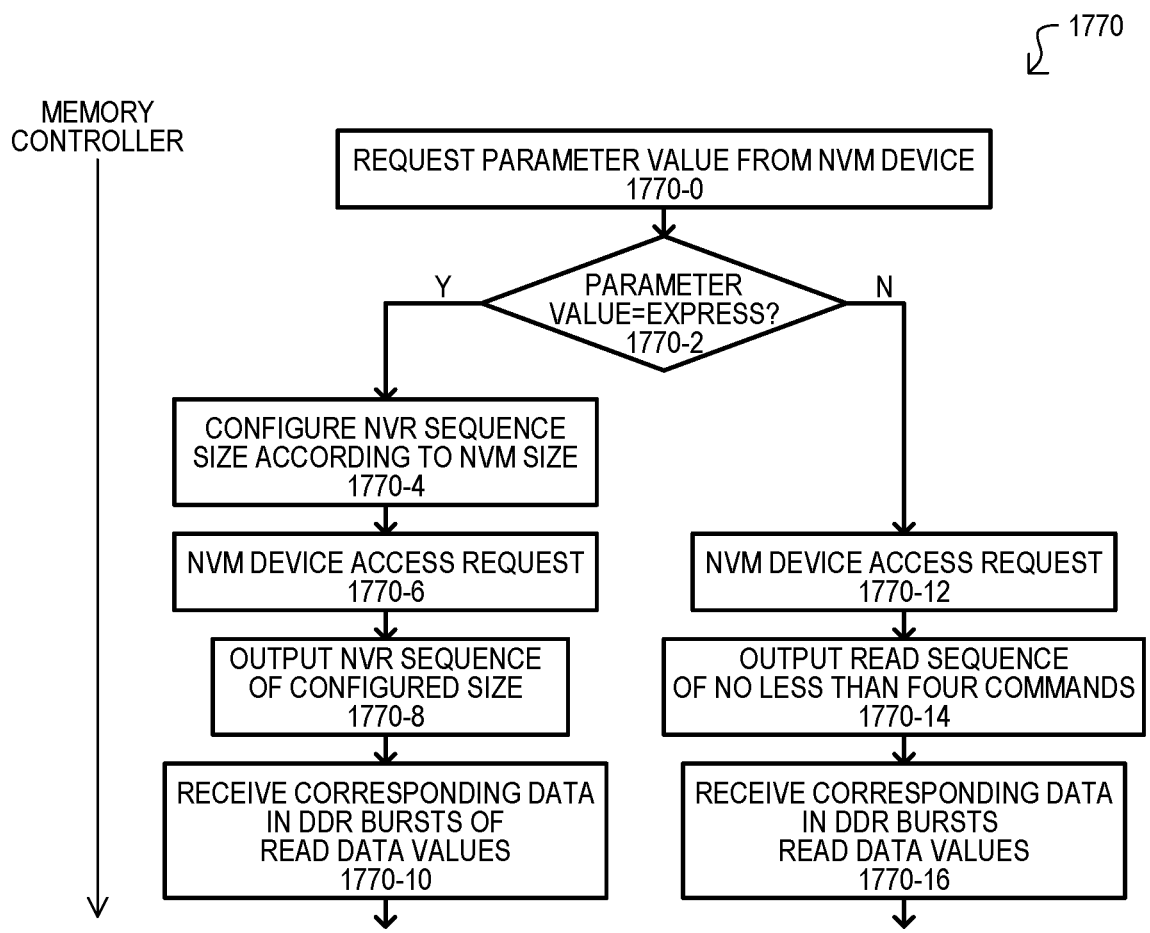
FIG. 17 is a flow diagram of a memory controller method according to an embodiment.

FIG. 17 is a flow diagram of another method 1770 according to an embodiment. A method 1770 can be executed by a memory controller, or the like, to access data stored in an NVM device. A method 1770 can include requesting a parameter value from an NVM device 1770-0. Such an action can include reading a parameter value from storage location (e.g., parameter register) of an NVM device. In some embodiments such a request can occur over a DDR I/F of the NVM device. However, in other embodiments such a request can occur over a serial I/F of the NVM device.

A method 1770 can determine if received parameter data indicates that the NVM device is capable of executing express access operations 1770-2. Such an action can include determining of one or more bits of a configuration value read from the NVM device has a predetermined value.

If a parameter value indicates a NVM device can execute express accesses (Y from 1770-2), a method 1770 can configure an NVR sequence size according to a size of an NVM device to be accessed 1770-4. For example, for some NVM devices, two NVR commands may have sufficient address bits to access all address locations. However, for a larger device additional NVR commands may be included to provide more address bits. A method 1770 can further include receiving a request to access the NVM device 1770-6. Such a request can be received by a memory controller from a CPU subsystem (e.g., host) or the like. In response to the request, a method 1770 can output an NVR sequence of the configured size 1770-8. Such an action can include outputting a sequence of NVR commands on a CA portion of a DDR bus, such as an LPDDR4 compatible bus. A method 1770 can include receiving data corresponding to the NVR sequence in a DDR burst of read data values 1770-10. Such an action can include receiving data with ECC data. Further, in some embodiments, data received in the burst of eight can match the size of a cache line for a system, or a whole number fraction of a cache line size (e.g., ½, ¼). In some embodiments, a DDR burst of read data values can be no more than eight. However, other embodiments can include bursts of larger sizes.

If a parameter value indicates a NVM device cannot execute express accesses (N from 1770-2), a method 1770 can include receiving a request to access the NVM device 1770-12. However, in response to such a request, a method 1770 can output a read sequence of no less than four commands 1770-14. Further, data can be received in a DDR bursts of data values 1770-16. In some embodiments, such data values can be in bursts greater than eight, such as bursts of 16 or 32.

Figure 18:
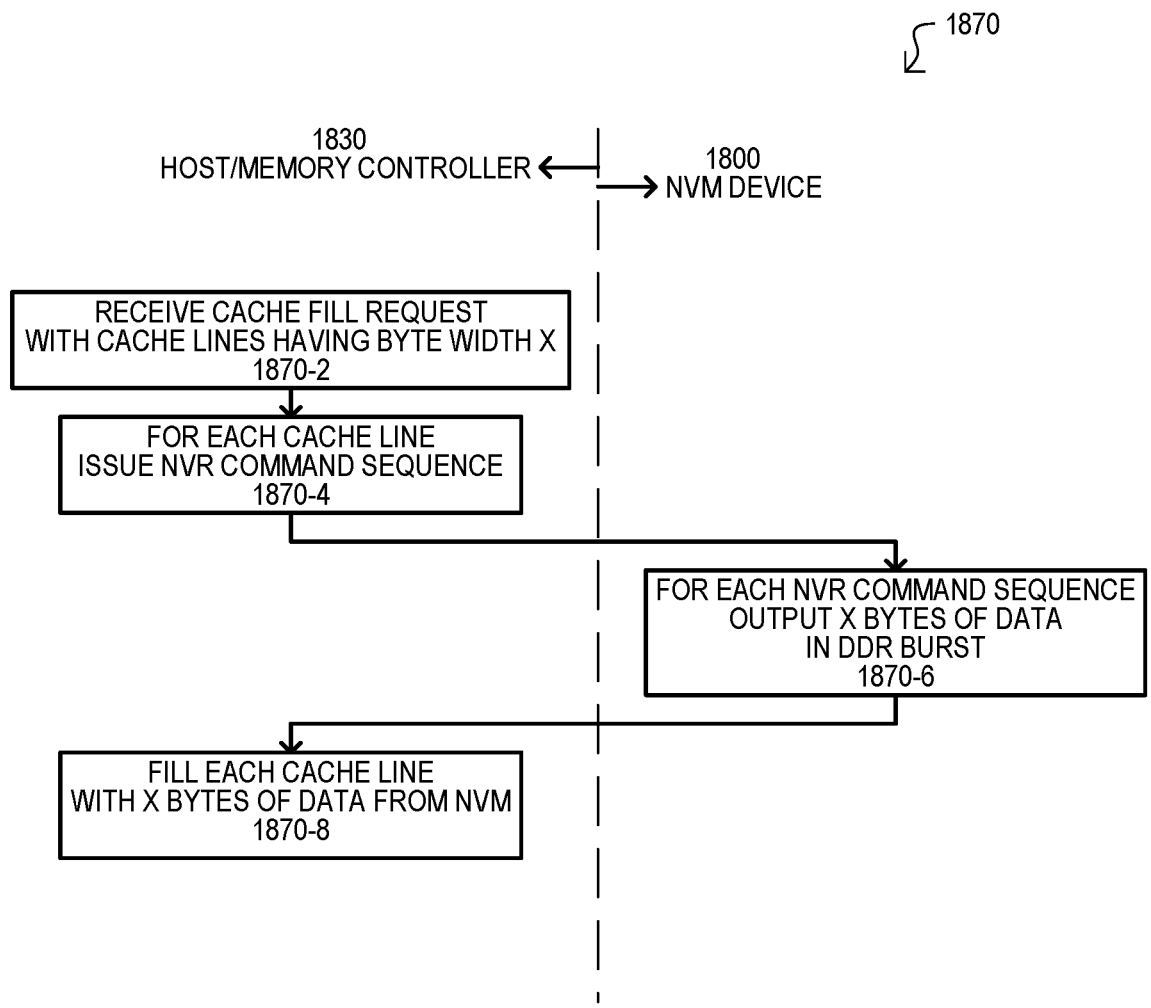
FIG. 18 is a flow diagram of system method according to an embodiment.

FIG. 18 is a flow diagram of another method 1870 according to another embodiment. A method 1870 can be executed by a system to fill cache lines of a cache memory with data read directly from one or more NVM devices. A method 1870 can include a host device or memory controller 1830 receiving a cache fill request for a cache having cache lines with a size of X bytes 1870-2. Such an action can include a host device issuing a read request to a memory controller. A value X is understood to be a number larger than one. In some embodiments, X can be an even integer larger than four. A method 1870 can include, for each cache line of the cache fill request, issuing a NVR command sequence 1870-4. Such an action can include issuing such a command sequence on a command address bus separate from a data bus. In some embodiments, such a command address bus can have a width of no more than six bits.

A method 1870 can include, for each NVR sequence, outputting X bytes of data in a DDR burst 1870-6. Such an action can include outputting data on DDR buses from more than one NVM device. In some embodiments, such an action can include outputting data from two different NVM devices in response to the same command-address values. In some embodiments, such a DDR burst can have a burst length of eight. However, in other embodiments, a DDR burst can be of larger size, such as 16 or 32.

A method 1870 can fill a cache line with X bytes of data received from one or more NVM devices 1870-8. Such an action can include filling a cache line without discarding any read data received from the NVM devices.

According to embodiments, a NVM device can provide high speed accesses for higher temperature systems. Such an NVM device can dispense with the need for a volatile memory, such as SRAM or DRAM. This can enable more a compact system and/or reduced system expense.

Figure 19:
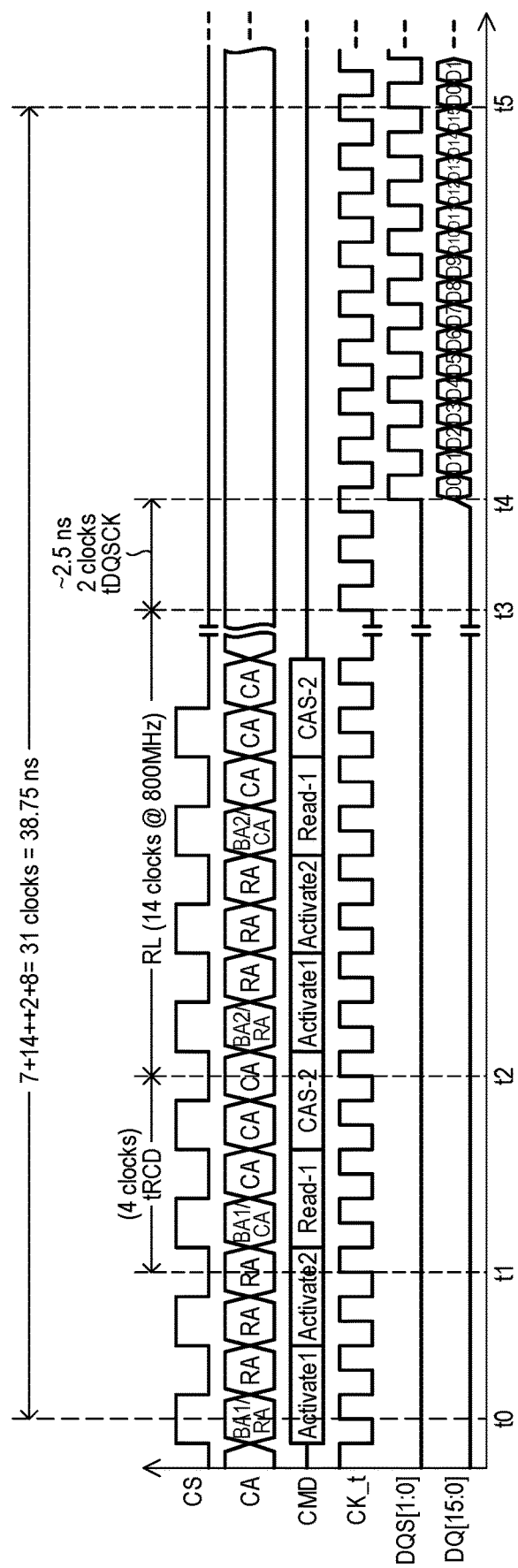
FIG. 19 is a timing diagram of a conventional LPDDR4 compatible read access according to an embodiment.

According to embodiments, a NVM device can provide more efficient use of a CA bus for smaller data transfers by enabling express access requests to be made over four clock cycles, as opposed to eight clock cycles. Further, smaller data transfers can enable more efficient cache fills. As but one of many possible examples, as shown by FIGS. 5 and 19, in a x32 configuration, a NVM device can have a cache line fill latency of 28.75 ns as opposed to a DRAM device latency of 38.75 ns (at an 800 MHz clock). Further, a DRAM access may end up discarding data. Such a capability can enable a new cache line fill every 5 ns (at an 800 MHz clock) as opposed to every 10 ns (with data being discarded).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An integrated circuit (IC) device, comprising:
a first command-address (CA) bus input that includes a plurality of first parallel CA inputs;
a second CA bus input that includes a plurality of second parallel CA inputs;
a plurality of nonvolatile memory (NVM) cell arrays;
a first command decoder configured to detect commands received at the first CA bus input[s], including express read (NVR) command sequences,
a second command decoder configured to detect commands received at the second CA bus input, including NVR command sequences,
each NVR command sequence including no more than two consecutive NVR read commands distinguishable from other read commands by bit values of the NVR command, and
each NVR command sequence terminates with a receipt of a command that is not an NVR command or an end to a receipt of consecutive NVR read commands;
first access circuits configured to access a first of the NVM cell arrays and output first read data in response to a first NVR command sequence received on the first CA input;
second access circuits configured to access a second of the NVM cell arrays and output second read data in response to a second NVR command sequence received on the second CA bus input; and
a data bus input/output (I/O) including a plurality of parallel data I/Os configured to receive the first read data and second read data in synchronism with rising and falling edges of a timing clock; wherein
the second NVR command sequence follows the first NVR command sequence with no intervening command data, and
the second read data follows the first read data with no intervening read data.

2. The IC device of claim 1, wherein:
the first and second CA bus inputs each include[s] six CA inputs coupled to a CA bus; and
the CA bus and data bus I/O are compatible with the LPDDR4 physical interface standard.

3. The IC device of claim 1, wherein:
all address data for accessing the first read data are included in the first NVR command sequence; and
all address data for accessing the second read data are included in the second NVR command sequence.

4. The IC device of claim 1, wherein:
the NVR read commands include bit value locations corresponding to bit value locations of commands compatible with the LPDDR4 standard, and
at least one NVR read command includes address data at a bit location where an LPDDR4 compatible command includes command data.

5. The IC device of claim 1, wherein:
each NVR read command is received at one of the CA bus inputs over an integer multiple of two cycles of the timing clock, the integer being greater than or equal to one.

6. The IC device of claim 1, further including:
a first serial bus input including at least one serial I/O line configured to receive first serial command and address data; and
the first access circuits are configured to access at least the first NVM cell array in response to first serial command and address data.

7. The IC device of claim 6, further including:
a second serial bus input including at least one serial I/O line configured to receive second serial command and address data; and
the second access circuits are configured to access at least the second NVM cell array in response to the second serial command and address data.

8. The IC device of claim 1, wherein:
the first read data and the second read data have a burst length (BL) that is configurable to one of a plurality of BL values, at least one BL value being no more than eight.

9. The IC device of claim 1, wherein:
the first CA bus input, first command decoder, the first NVM cell array and the first access circuits are formed with a first IC substrate;
the second CA bus input, the second command decoder, the second NVM cell array and the second access circuits are formed with a second IC substrate; and
the first and second IC substrates are commonly coupled to the data bus IO.

10. The IC device of claim 9, wherein:
the first and second IC substrates are formed in a same IC package.

11. The IC device of claim 9, wherein:
the first and second IC substrates are formed in different IC packages.

12. The IC device of claim 1, wherein:
the first and second NVR command sequences are data transfers to a same cache line of cache memory.

13. The IC device of claim 12, wherein:
the first read data and second read data are each bursts of eight data values that include 16 bytes of data; and
the cache line stores 32 bytes of data.

* * * * *